United States Patent
Lee et al.

(10) Patent No.: US 9,577,860 B2
(45) Date of Patent: Feb. 21, 2017

(54) METHOD AND APPARATUS FOR REDUCING PEAK-TO-AVERAGE POWER RATIO IN SINGLE CARRIER-FREQUENCY DIVISION MULTIPLE ACCESS BASED RADIO COMMUNICATION SYSTEM

(71) Applicant: Samsung Electronics Co., Ltd., Suwon-si, Gyeonggi-do (KR)

(72) Inventors: Hak-Ju Lee, Seoul (KR); Jae-hyeon Bae, Seoul (KR); Sung-Ryul Yun, Suwon-si (KR); Hong-Sil Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 267 days.

(21) Appl. No.: 14/178,670

(22) Filed: Feb. 12, 2014

(65) Prior Publication Data

US 2014/0286248 A1    Sep. 25, 2014

(30) Foreign Application Priority Data

Mar. 22, 2013    (KR) ........................ 10-2013-0031166

(51) Int. Cl.
*H04L 27/26* (2006.01)
(52) U.S. Cl.
CPC ....... *H04L 27/2614* (2013.01); *H04L 27/2636* (2013.01)

(58) Field of Classification Search
CPC ............ H04L 27/2614; H04L 27/2636; H04L 5/0005; H04L 5/0017; Y02B 60/50
See application file for complete search history.

(56) References Cited

U.S. PATENT DOCUMENTS

| | | | |
|---|---|---|---|
| 2010/0034186 A1* | 2/2010 | Zhou | H04L 27/2621 370/344 |
| 2010/0246719 A1* | 9/2010 | Ko | H04L 5/0053 375/303 |
| 2011/0164706 A1* | 7/2011 | Yokokawa | H04L 27/2602 375/340 |
| 2012/0269285 A1 | 10/2012 | Jeong et al. | |
| 2013/0121306 A1* | 5/2013 | Murakami | H04B 7/0697 370/330 |

FOREIGN PATENT DOCUMENTS

KR    10-2011-0031142 A    3/2011

* cited by examiner

*Primary Examiner* — Siming Liu
(74) *Attorney, Agent, or Firm* — Jefferson IP Law, LLP

(57) ABSTRACT

A method for reducing Peak-to-Average Power Ratio (PAPR) in a Single Carrier Frequency Division Multiple Access (SC-FDMA) based radio communication system is provided. The method includes arranging symbols mapped to predetermined sub-carrier allocation types such that phases of the symbols do not overlap, and transmitting the arranged symbols.

8 Claims, 7 Drawing Sheets

METHOD AND APPARATUS FOR REDUCING PEAK-TO-AVERAGE POWER RATIO IN SINGLE CARRIER-FREQUENCY DIVISION MULTIPLE ACCESS BASED RADIO COMMUNICATION SYSTEM

CROSS-REFERENCE TO RELATED APPLICATION(S)

This application claims the benefit under 35 U.S.C. §119 (a) of a Korean patent application filed on Mar. 22, 2013 in the Korean Intellectual Property Office and assigned Serial number 10-2013-0031166, the entire disclosure of which is hereby incorporated by reference.

TECHNICAL FIELD

The present disclosure relates to a method and apparatus for reducing Peak-to-Average Power Ratio (PAPR) in a Single Carrier Frequency Division Multiple Access (SC-FDMA) based radio communication system.

BACKGROUND

Single Carrier Frequency Division Multiple Access (SC-FDMA) has been introduced to improve Peak-to-Average Power Ratio (PAPR) of communication systems using Orthogonal Frequency Division Multiplexing (OFDM). In theory, SC-FDMA has nearly the same PAPR efficiency as in the single carrier system. However, in an SC-FDMA application, resources may be wasted because signals are not allocated to some sub-carriers that constitute an entire frequency band.

On the other hand, if all the sub-carriers are used, use of SC-FDMA is unlikely to improve PAPR due to signal overlapping. Therefore, a need exists for an apparatus and method to reduce PAPR even when the entire frequency band is used for SC-FDMA.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for reducing Peak-to-Average Power Ratio (PAPR) in a Single Carrier Frequency Division Multiple Access (SC-FDMA) based radio communication system.

In accordance with an aspect of the present disclosure, a method for reducing PAPR in an SC-FDMA based radio communication system is provided. The method includes arranging symbols mapped to predetermined sub-carrier allocation types such that phases of the symbols do not overlap, and transmitting the arranged symbols.

In accordance with another aspect of the present disclosure, an apparatus for reducing PAPR in an SC-FDMA based radio communication system is provided. The apparatus includes a controller configured to arrange symbols mapped to predetermined sub-carrier allocation types such that phases of the symbols do not overlap, and a transmitter configured to transmit the arranged symbols.

In accordance with another aspect of the present disclosure, a method for reducing PAPR in an SC-FDMA based radio communication system is provided. The method includes receiving symbols mapped to predetermined sub-carrier allocation types and arranged such that phases of the symbols do not overlap, determining a sequential combination of Physical Layer Pipes (PLPs) that has the lowest PAPR based on the received symbols, and demodulating user packets mapped to each of sub-carrier allocation types in the determined sequential combination of PLPs.

In accordance with another aspect of the present disclosure, a receiver for reducing PAPR in an SC-FDMA based radio communication system is provided. The receiver includes a transceiver configured to receive symbols mapped to predetermined sub-carrier allocation types and arranged such that phases of the symbols do not overlap, a controller configured to determine a sequential combination of PLPs that has the lowest PAPR based on the received symbols, and a demodulator configured to demodulate user packets mapped to each of sub-carrier allocation types in the determined sequential combination of PLPs.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skilled in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
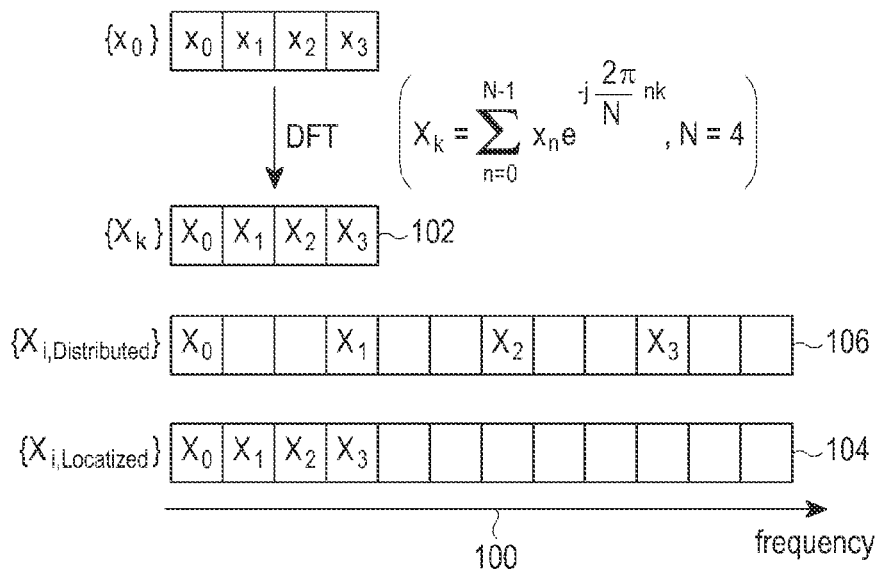
FIG. 1 illustrates an example where only some sub-carriers constituting an entire frequency band are used in a Single Carrier Frequency Division Multiple Access (SC-FDMA) system of the related art.

FIG. 1 illustrates an example where only some sub-carriers constituting an entire frequency band are used in a Single Carrier Frequency Division Multiple Access (SC-FDMA) system of the related art.

Referring to FIG. 1, a Discrete Fourier Transform (DFT) may be performed on signal $X_n$ as expressed in the following Equation 1:

$$X_k = \sum_{n=0}^{N-1} x_n e^{-j\frac{2\pi}{N}nk}, n = 4 \qquad \text{Equation (1)}$$

In general, resultant signals from the DFT, "$X_k$: $X_0$, $X_1$, $X_2$, $X_3$" 102 are allocated to parts of an entire frequency band 100 as represented by reference numeral 104.

In case of SC-FDMA based frequency resource allocation, as represented by reference numeral 106, the resultant signals from the DFT may be distributed by allocating '0's to two sub-carriers located between sub-carriers to which the resultant signals from the DFT are allocated.

However, if all the sub-carriers of the entire frequency band 100 are used for SC-FDMA, improvement in PAPR efficiency due to the distributed signal allocation is hardly expected.

Figure 2A:
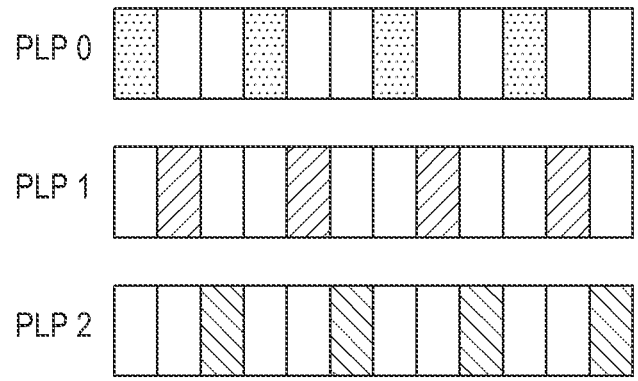
FIGS. 2A and 2B illustrate an example where all sub-carriers constituting an entire frequency band are used in an SC-FDMA system of the related art.
Figure 2B:
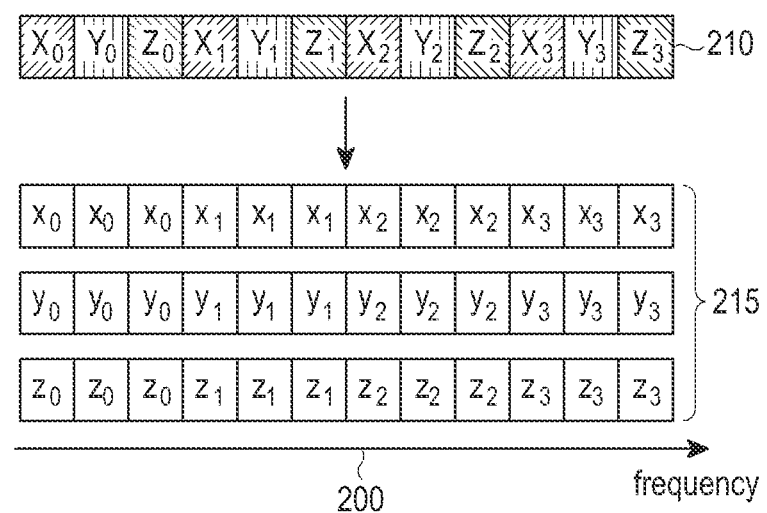

FIGS. 2A and 2B illustrate an example where all sub-carriers constituting an entire frequency band are used in an SC-FDMA system of the related art.

Referring to FIGS. 2A and 2B, signals for transmission are distributed in each of three types of Physical Layer Pipes (PLPs) in an entire frequency band 200. In each of the three types of PLPs, PLP0, PLP1 and PLP2, shaded blocks represent blocks to which signals are allocated while unshaded blocks represent blocks to which '0's are allocated.

It is assumed that the three PLPs are programs transmitted by a broadcast system in the entire frequency band 200. As illustrated in FIG. 2B, signals transmitted in the entire frequency band 200 are represented as a combination of signals for PLP0, PLP 1 and PLP2, as indicated by reference numeral 210, wherein Xn indicates an $n^{th}$ signal for PLP0; Yn indicates an $n^{th}$ signal for PLP1; and Zn indicates an $n^{th}$ signal for PLP2.

In the time domain, combined signals of PLP0, PLP1 and PLP2 in the entire frequency band 200 may be represented as indicated by reference numeral 215, wherein $x_n$ represents a modulation symbol in the time domain of PLP0; $y_n$ represents a modulation symbol in the time domain of PLP1; and $z_n$ represents a modulation symbol in the time domain of PLP2. As a result, all signals are represented in a combined form of the three PLPs, i.e., all signals have a waveform in which xn, yn and zn are all combined in the time domain. An SC-FDMA system of the related art has the same PAPR efficiency as in case of using a single carrier, by sending signals of only one of the three PLPs. On the contrary, combining signals of all three PLP types causes signal overlapping in the time domain, thereby increasing PAPR.

Therefore, various embodiments of the present disclosure provide an apparatus and method to reduce PAPR in an SC-FDMA communication system that uses an entire frequency band. In various embodiments of the present disclosure, to avoid signal overlapping, phase adjustment is performed such that phases of PLPs mapped to signals for transmission do not overlap each other. In other embodiments, PLP rearrangement is performed to remap signals to PLPs sequenced in a combination that has lowest PAPR. In various embodiments of the present disclosure as will be described below, it is assumed that phase adjustment and PLP rearrangement are both performed. However, in other embodiments, the phase adjustment and the PLP rearrangement may be performed independently. In order for a transmitter to apply SC-FDMA with all sub-carriers that constitute an entire frequency band, sub-carriers to which signals are allocated for each PLP constitute all the sub-carriers.

Figure 3:
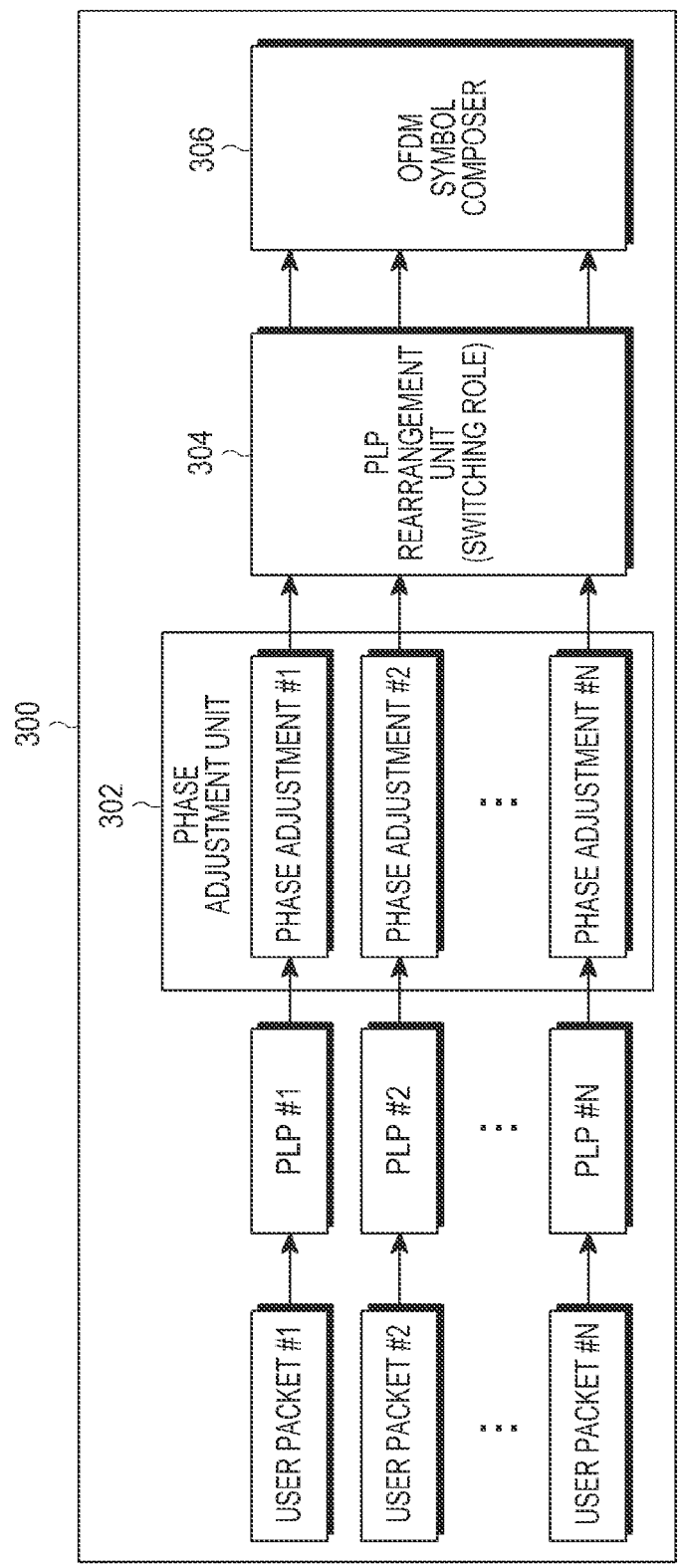
FIG. 3 is a schematic block diagram of a transmitter that performs SC-FDMA according to an embodiment of the present disclosure.

FIG. 3 is a schematic block diagram of a transmitter that performs SC-FDMA according to an embodiment of the present disclosure.

Referring to FIG. 3, a transmitter 300 may include a phase adjustment unit 302, a PLP rearrangement unit 304, and an Orthogonal Frequency Division Multiplexing (OFDM) symbol composer 306.

The transmitter 300 may sequentially map N user packets to corresponding PLPs and perform channel coding and modulation on the mapped user packets.

The phase adjustment unit 302 may make phase adjustment such that phases for PLPs do not overlap each other, i.e., phases for PLPs are different. Additional functions of the transmitter 300 will be described below.

Figure 4A:
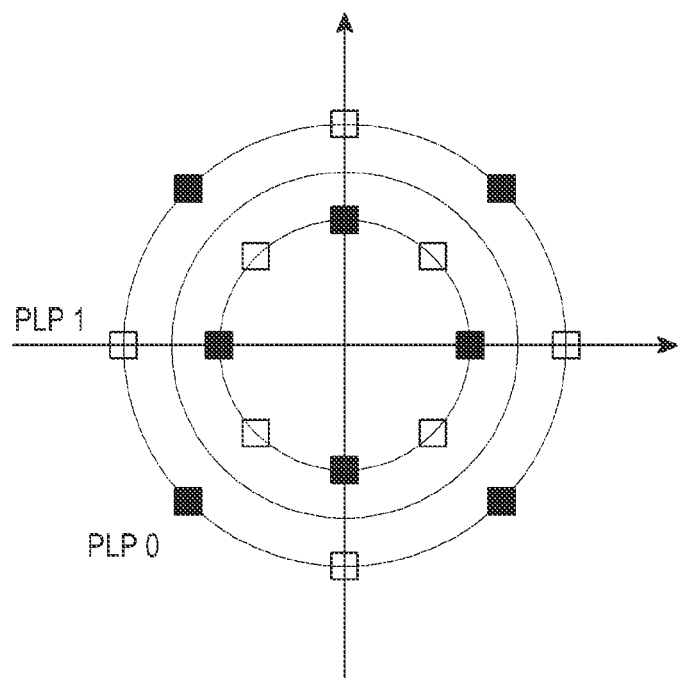
FIGS. 4A and 4B illustrate phase adjustment in Physical Layer Pipes (PLPs) according to various embodiments of the present disclosure.
Figure 4B:
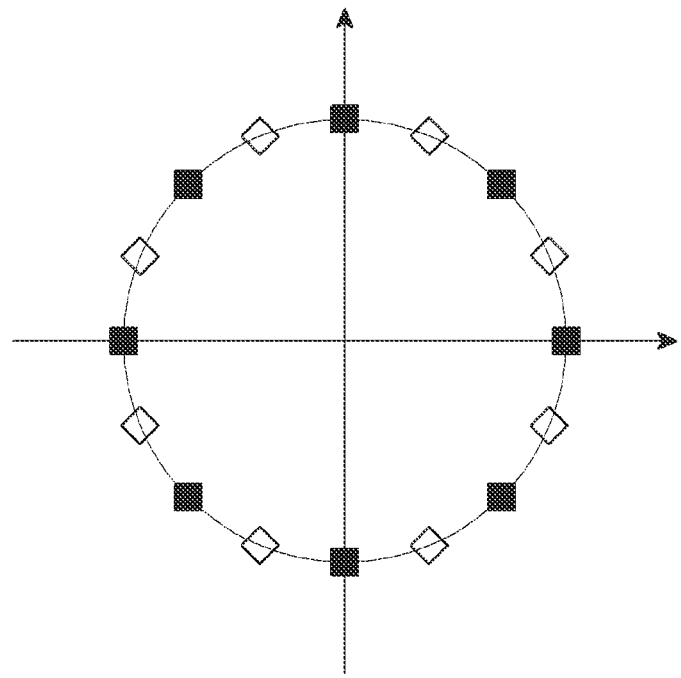

FIGS. 4A and 4B illustrate phase adjustment for PLPs according to various embodiments of the present disclosure. For convenience of explanation, it is assumed that the phase adjustment unit 302 arranges phases of symbols for each of two PLPs, PLP0 and PLP1, and the PLPs each employ 8 Phase Shift Keying (8PSK) symbol mapping.

Referring to FIGS. 4A and 4B, the phase adjustment unit 302 may make phase adjustment such that phases of symbols for PLP1 do not overlap with those for PLP2. In FIGS. 4A and 4B, the shaded and unshaded squares represent symbols for PLP1 and PLP2, respectively, which are arranged according to an embodiment of the present disclosure. As shown in FIG. 4A, phases of symbols for PLP1 and PLP2 are arranged not to overlap each other. Accordingly, even under a situation where a symbol for PLP1 and a symbol for PLP2 overlap in the time domain, phase overlapping would not occur. This prevents an occurrence of a highest peak value at the overlapped symbols, leading to reduction in PAPR.

The phase adjustment unit 302 may prevent the occurrence of the highest peak by ensuring that signal constellations for symbols of PLP1 and PLP2 are different.

However, phases of symbols for PLP1 and PLP2 may be arranged close to each other, as shown in FIG. 4B. In this case, the maximum peak may occur.

To prevent possible occurrence of the highest peak that may result from symbols being arranged closely by the phase adjustment unit 302, the PLP rearrangement unit 304 performs PLP rearrangement.

Figure 5:
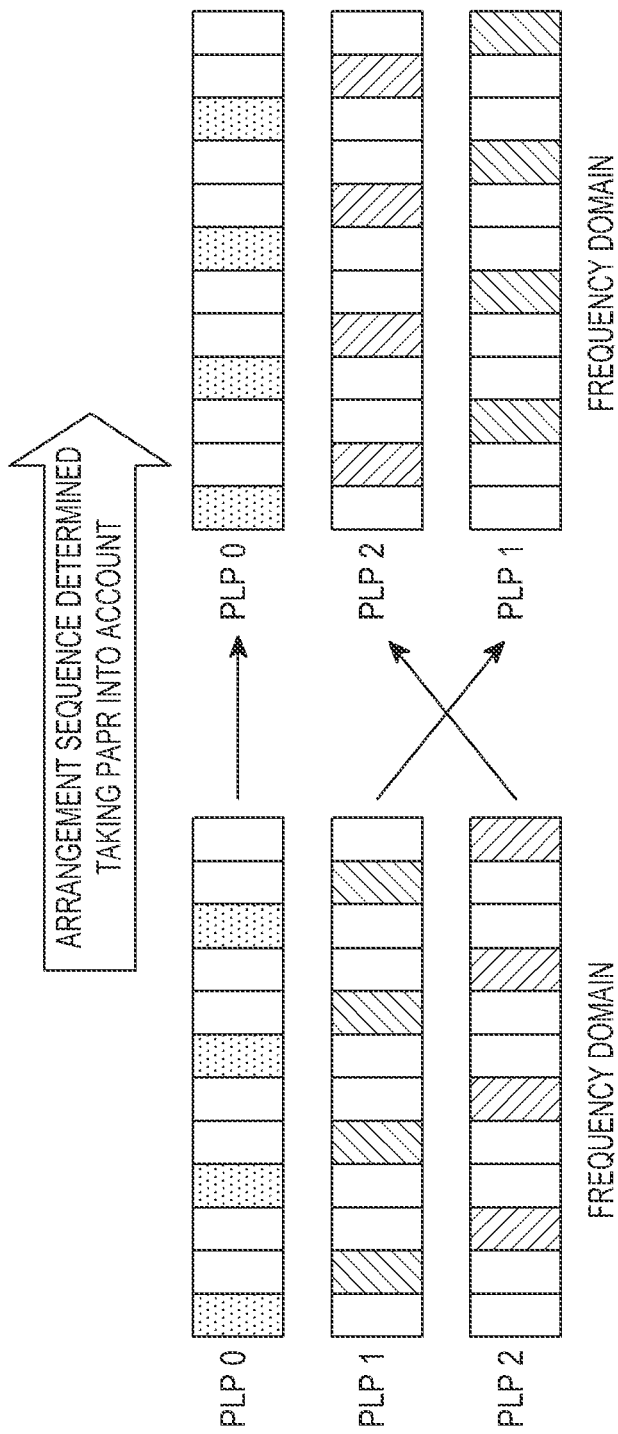
FIG. 5 illustrates PLP rearrangement according to various embodiments of the present disclosure.

FIG. 5 illustrates PLP rearrangement according to an embodiment of the present disclosure.

Referring to FIG. 5, the PLP rearrangement unit 304 may calculate PAPR of each combination of all the PLPs available for user packets. A combination that has the lowest PAPR may be selected from among all the combinations of the PLPs. The PLP rearrangement unit 304 may remap the user packets to PLPs sequenced in the selected combination and output results of the remapping to the OFDM symbol unit 306.

For example, it is assumed that three user packets were mapped in the following sequence: PLP0, PLP1, PLP2. The PLP rearrangement unit 304 calculates PAPR for each of the combinations of PLP0, PLP1 and PLP2, i.e., six combinations. As another example, it is assumed that PAPR is lowest when the PLPs have the following sequence: PLP0, PLP2, PLP1. Then, the PLP rearrangement unit 304 performs mapping of the user packets by changing the sequence PLP1-->PLP2 to the sequence PLP2-->PLP1 based on the combination that has the lowest PAPR.

Such PLP rearrangement performed by the PLP rearrangement unit 304 also leads to a change of signals in the time domain. This is because outputs of Inverse Fast Fourier Transform for OFDM come out as a combined value of products multiplied by different sinusoids for sub-carriers. Accordingly, symbols in the time domain may appear in different forms depending on the arrangement sequence of PLPs.

The OFDM symbol composer 306 composes OFDM symbols based on the PLP arrangement and the transmitter 300 transmits the OFDM symbols.

Figure 6:
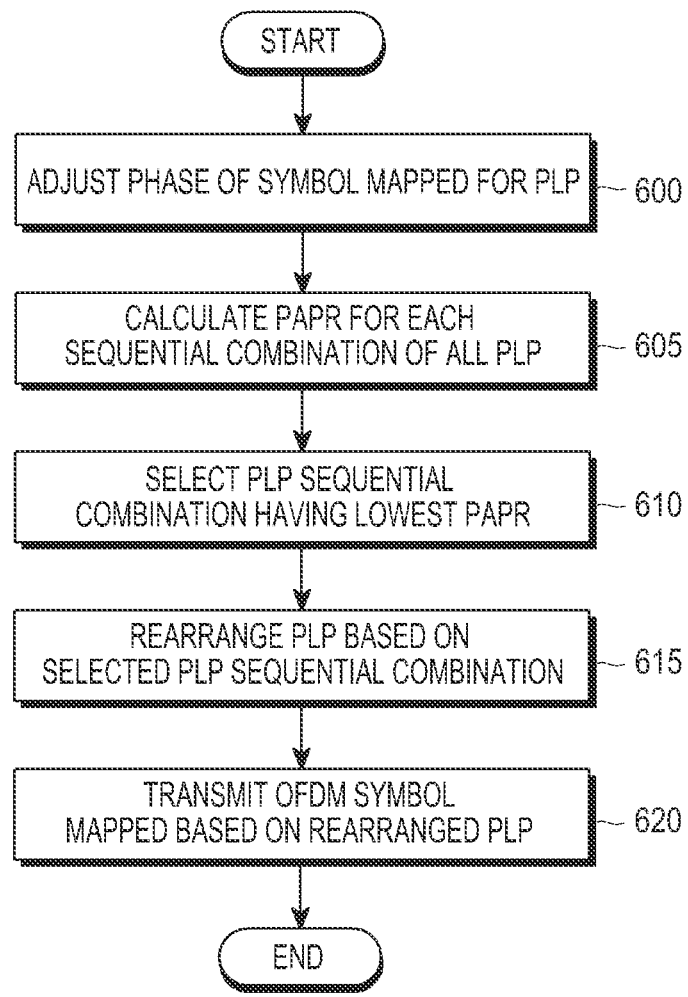
FIG. 6 is a flowchart illustrating operations of a transmitter that performs SC-FDMA according to an embodiment of the present disclosure.

FIG. 6 is a flowchart illustrating operations of a transmitter that performs SC-FDMA according to an embodiment of the present disclosure. For convenience of explanation, it is assumed that operations are performed by a transmitter.

Referring to FIG. 6, in operation 600, the transmitter may make phase adjustment such that phases of symbols mapped for PLPs do not overlap each other. The adjustment operation was described above in connection with the phase adjustment unit 302 of FIG. 3, so a detailed description will be omitted herein.

In operation 605, the transmitter may calculate PAPR for each combination of all the PLPs mappable for user packets. In operation 610, the transmitter may select a combination that has the lowest PAPR. In operation 615, the transmitter may rearrange the user packets for the PLPs in the selected combination. In operation 620, the transmitter may transmit OFDM symbols resulting from symbol mapping based on the rearranged PLPs.

As such, performing phase adjustment and PLP rearrangement in accordance with the various embodiments of the present disclosure may reduce PAPR even while all sub-carriers are used in an SC-FDMA application.

Figure 7:
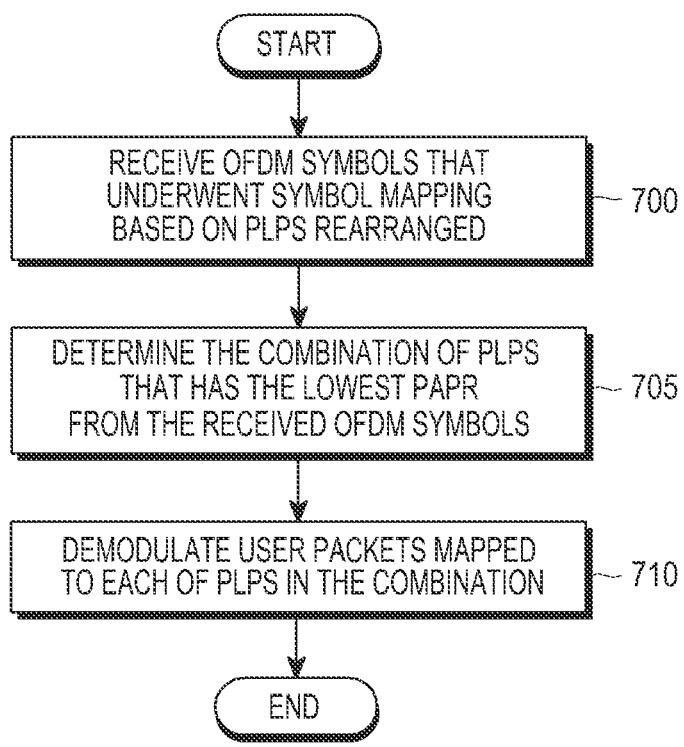
FIG. 7 is flowchart illustrating operations of a receiver according to an embodiment of the present disclosure.

FIG. 7 is a flowchart illustrating operations of a receiver according to an embodiment of the present disclosure.

Referring to FIG. 7, a receiver may receive OFDM symbols that underwent symbol mapping based on PLPs rearranged by a transmitter in operation 700. The rearranged PLPs are in a (sequential) combination that has the lowest PAPR among all the possible combinations of mappable PLPs, as described above.

In operation 705, the receiver may determine the combination of PLPs that has the lowest PAPR from the received OFDM symbols. In operation 710, the receiver may demodulate user packets mapped to each of PLPs in the combination determined in operation 705.

Figure 8:
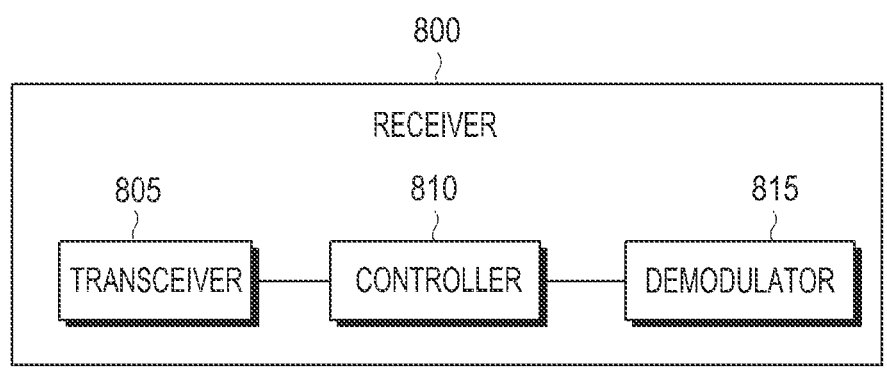
FIG. 8 is a block diagram of a receiver according to an embodiment of the present disclosure.

FIG. 8 is a block diagram of a receiver according to an embodiment of the present disclosure. Although, for convenience of explanation, a receiver 800 herein is shown to include components corresponding to operations as shown in FIG. 7, such components may be divided into sub-units or integrated in one unit.

Referring to FIG. 8, the receiver 800 may include a transceiver 805, a controller 810, and a demodulator 815. The transceiver 805 may operate according to operation 700. That is, the controller 810 may control the transceiver 805 to operate according to operation 700 to determine the combination of PLPs that has the lowest PAPR from the received OFDM symbols, as shown in operation 705, and to control the demodulator 815 to perform demodulation according to operation 710.

According to the various embodiments of the present disclosure, PAPR may be reduced even while all the sub-carriers of an entire frequency band are used in an SC-FDMA application, by making phase adjustment such that phases of symbols mapped for each combination of PLPs to which a different type of sub-carrier allocation is applied do not overlap, selecting a combination of the PLPs that has the lowest PAPR from among all the combinations of the PLPs, and rearranging the PLPs to conform to the selected combination.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for transmitting a signal in a single carrier frequency division multiple access (SC-FDMA) based radio communication system, the method comprising:
    selecting at least two physical layer pipes (PLPs) among a plurality of PLPs, wherein each symbol included in each of the at least two PLPs is allocated to a different subcarrier within a plurality of subcarriers included in a frequency region;
    configuring the signal by combining the selected at least two PLPs;
    adjusting first phases of first symbols included in a first PLP among the at least two PLPs such that the first phases and second phases do not overlap each other, wherein the second phases of second symbols are included in a second PLP among the at least two PLPs;
    determining a minimum combination order having a minimum peak-to-average power ratio (PAPR) among combination orders for the phase adjusted at least two PLPs within the signal;
    re-configuring the signal by arranging the first symbols and the second symbols according to the minimum combination order; and
    transmitting the reconfigured signal.

2. The method of claim 1, wherein the adjusted first phases of the first symbols and the second phases of the second symbols included in the re-configured signal do not overlap.

3. A method for receiving a signal in a single carrier frequency division multiple access (SC-FDMA) based radio communication system, the method comprising:
    receiving, from a transmitter, a reconfigured signal of a signal generated by combining at least two physical layer pipes (PLPs) among a plurality of PLPs, wherein each symbol included in each of the at least two PLPs is allocated to a different subcarrier within a plurality of subcarriers included in a frequency region; and de-modulating the reconfigured signal, wherein first phases of first symbols included in a first PLP among the at least two PLPs is adjusted such that the first phases and second phases do not overlap each other, wherein the second phases of second symbols are included in a second PLP among the at least two PLPs, wherein the reconfigured signal is generated by arranging the first symbols and the second symbols corresponding to a minimum combination order, and wherein the minimum combination order has a minimum peak-to-average power ratio (PAPR) among combination orders for the phase adjusted at least two PLPs within the signal.

4. The method of claim 3, wherein the first phases of the first symbols and the second phases of the second symbols included in the re-configured signal do not overlap.

5. An apparatus for transmitting a signal in a single carrier frequency division multiple access (SC-FDMA) based radio communication system, the apparatus comprising:

a processor configured to:
  select at least two physical layer pipes (PLPs) among a plurality of PLPs, wherein each symbol included in each of the at least two PLPs is allocated to a different subcarrier within a plurality of subcarriers included in a frequency region,
  configure the signal by combining the selected at least two PLPs,
  adjust first phases of first symbols included in a first PLP among the at least two PLPs such that the first phases and second phases do not overlap each other, wherein the second phases of second symbols are included in a second PLP among the at least two PLPs,
  determine a minimum combination order having a minimum peak-to-average power ratio (PAPR) among combination orders for the phase adjusted at least two PLPs within the signal, and
  re-configure the signal by arranging the first symbols and the second symbols corresponding to the minimum combination order; and a transceiver configured to transmit the reconfigured signal.

6. The apparatus of claim 5, wherein the first phases of the first symbols and the second phases of the second symbols included in the reconfigured signal do not overlap.

7. An apparatus for receiving a signal in a single carrier frequency division multiple access (SC-FDMA) based radio communication system, the apparatus comprising:

a transceiver configured to receive, from a transmitter, a reconfigured signal generated by combining at least two physical layer pipes (PLPs) among a plurality of PLPs, wherein each symbol included in each of the at least two PLPs is allocated to a different subcarrier within a plurality of subcarriers included in a frequency region;

and a demodulator configured to demodulate the reconfigured signal, wherein first phases of first symbols included in a first PLP among the at least two PLPs is adjusted such that the first phases and second phases do not overlap each other, wherein the second phases of second symbols are included in a second PLP among the at least two PLPs, wherein the reconfigured signal is reconfigured by arranging the first symbols and the second symbols corresponding to a minimum combination order, and wherein the minimum combination order has a minimum peak-to-average power ratio (PAPR) among combination orders for the phase adjusted at least two PLPs within the signal.

8. The apparatus of claim 7, wherein the first phases of the first symbols and the second phases of the second symbols included in the reconfigured signal do not overlap.

* * * * *